P. E. NOLDEN.
AIR FILTER.
APPLICATION FILED JUNE 14, 1913.
1,091,695.
Patented Mar. 31, 1914.
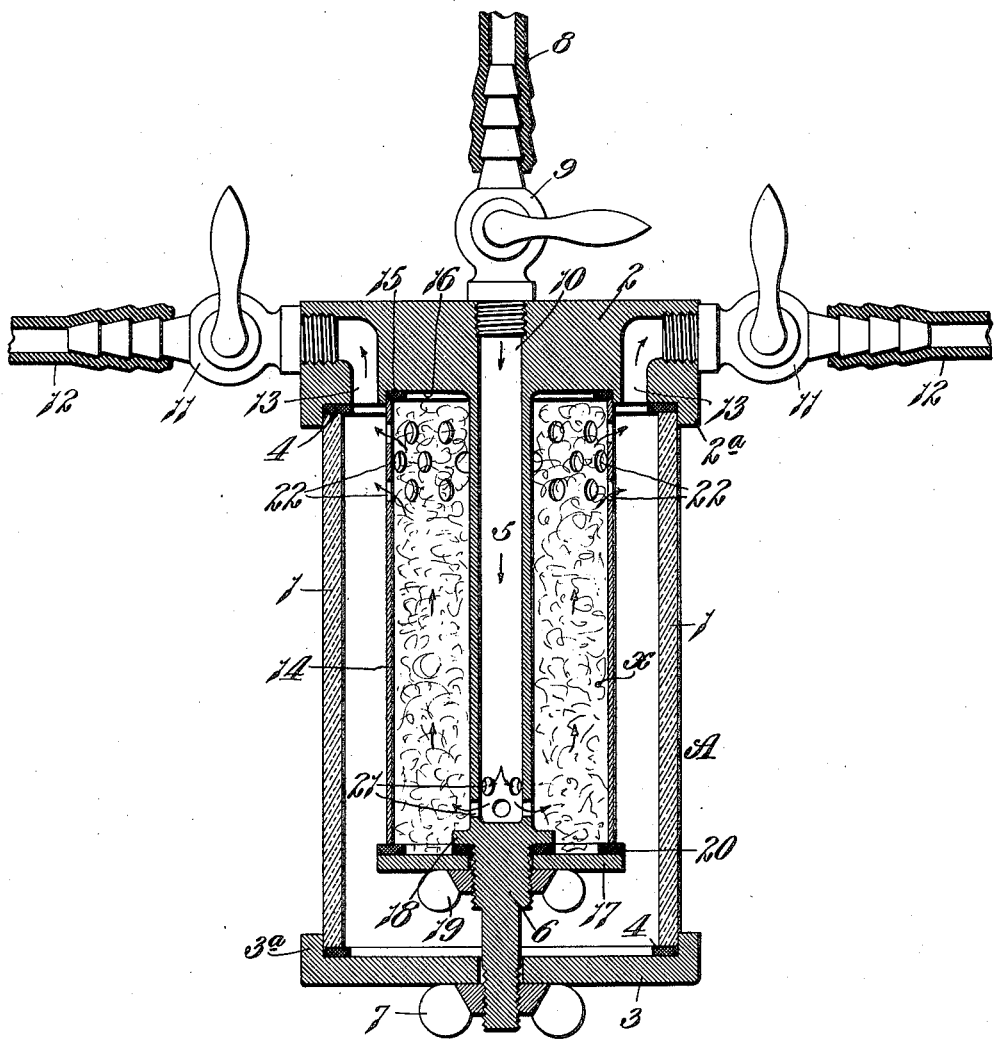
Witnesses:
Geo. R. Ridson
C. M. Badger
Inventor,
Paul E. Nolden.
By Bakewell & Churchitys

UNITED STATES PATENT OFFICE.

PAUL E. NOLDEN, OF ST. LOUIS, MISSOURI, ASSIGNOR TO ANHEUSER-BUSCH BREWING ASSOCIATION, OF ST. LOUIS, MISSOURI, A CORPORATION OF MISSOURI.

AIR-FILTER.

1,091,695. Specification of Letters Patent. Patented Mar. 31, 1914.

Application filed June 14, 1913. Serial No. 773,697.

*To all whom it may concern:*

Be it known that I, PAUL E. NOLDEN, a citizen of the United States, residing at St. Louis, Missouri, have invented a certain new and useful Improvement in Air-Filters, of which the following is a full, clear, and exact description, such as will enable others skilled in the art to which it appertains to make and use the same.

This invention relates to air-filtering apparatuses, and particularly to the means used in beer-dispensing apparatuses for filtering the air supplied by the pump and distributing the air to the kegs or barrels which contain the beer.

One object of my invention is to provide an efficient air-filter and distributer that can be taken apart easily so as to cleanse same and renew the filtering material.

Another object is to provide a device of the character described that presents a neat and ornamental appearance and which can be manufactured at a low cost.

The figure of the drawings is a vertical sectional view of an air-filter and distributer for a liquid-dispensing apparatus constructed in accordance with my invention.

Referring to the drawings which illustrate the preferred form of my invention, A designates an air-tight receptacle composed of a cylindrical-shaped shell 1, a top piece 2 and a bottom piece 3 that are securely clamped to said shell. The shell 1 is preferably formed of glass or some other suitable transparent material, and the upper and lower ends of same fit in annular flanges 2ª and 3ª on the top and bottom members 2 and 3, respectively, of the device, gaskets 4 being preferably interposed between the ends of the shell 1 and the members 2 and 3 so as to form air-tight joints between said parts. A vertically-disposed tube 5, which is preferably formed integral with the top member 2 and depends therefrom, is provided at its lower end with a solid shank or extension 6 that projects downwardly through the bottom member 3 of the receptacle, and a winged nut 7 is mounted on a screw-threaded portion of said shank 6 below the bottom member 3 so as to securely clamp the shell 1 of the receptacle between the top and bottom members 2 and 3 when the nut 7 is tightened. A tube 8 that leads from a pump or other source of air pressure, not shown, is connected to a cock 9 that is screwed into an opening 10 formed in the top member 2 at a point in alinement with the air-tube 5, and a plurality of air-distributing cocks or valves 11, are connected to the top member 2 of the device so as to control the passage of the air from the receptacle A to the tubes 12 that lead to the kegs or barrels, not shown, which contain the beer, the air-distributing valves 11 being tapped into openings 13 in the top member 2 that terminate on the under side of said member at a point between the shell 1 and the casing hereinafter described for holding the filtering material.

The air that is supplied to the receptacle A through the tube 8 is filtered before it leaves said receptacle by means of a mass of cotton or some other suitable filtering material *x* which is arranged inside of the receptacle A in the path of travel of the air. Said filtering material *x* surrounds the air-tube 5, and it is retained in position by means of a cylindrical-shaped casing 14 whose upper end bears against a gasket 15 on the under side of the top member 2 of the device, it being preferable to form an annular recess 16 on the under side of the member 2 to receive the gasket 15 and also the upper edge of the casing 14 so as to center the upper end of said casing and prevent it from moving laterally with relation to the air-tube 5. The lower end of the casing 14 is closed by a removable bottom cap 17 which is held pressed tightly against the lower end of the casing and against a stop 18 at the lower end of the air-tube 5 by means of a winged nut 19 that is mounted on a screw-threaded portion of the extension 6 of the air-tube, as shown in the drawing. Gaskets 20 are preferably arranged between the cap 17 and the lower end of the casing 14 and between said cap and the stop 18, so as to form air-tight joints between said parts. The lower end of the air-tube 5 is closed but ports 21 are formed in said tube adjacent the lower end of same so that the air which passes downwardly through said tube will escape laterally into the filtering material *x* and pass upwardly through said filtering material to ports 22 that are formed in the casing 14 adjacent the upper end of same. After the filtered air has passed through the ports 22 into the space between the casing 14 and the shell 1 of the receptacle A it can escape from the device through the distributing valves 11, provided of course that said valves are open, the arrows in the drawing indicating the passage of the air.

A device of the construction above described insures a thorough filtering of the air owing to the fact that the air-tube 5 and the casing 14 that surrounds the filtering material are so constructed that the air has to pass through a large body of filtering material before it can enter the tubes 12 that lead to the kegs or barrels which contain the beer, it being impossible for the air to escape from the casing 14 without first passing upwardly through the filtering material in the device. The device can be taken apart quickly and easily simply by taking off the winged nut 7 and removing the bottom member and the shell of the receptacle A and then removing the winged nut 19 that retains the casing for the filtering material in position. Consequently, it is a very simple matter to renew the filtering material and clean out the sediment that collects in the device.

Another desirable feature is that any sediment that collects in the receptacle A can be seen without taking the device apart owing to the fact that the side wall of said receptacle is formed of transparent material and the bottom of same is flat or level. The top member 2 is formed in one piece and is so designed that it acts as a closure for the upper end of the casing for the filtering material and prevents said casing from shifting laterally out of operative position. In addition to the desirable features above mentioned the device presents a neat and ornamental appearance and it comprises only a few parts of simple design that can be manufactured at a low cost.

Having thus described my invention, what I claim as new and desire to secure by Letters Patent is:

1. An air filtering and distributing device comprising a receptacle composed of a top and bottom member and a shell interposed between said members, an air-tube depending from said top member and provided with a shank that projects through said bottom member, a nut on said shank arranged below said bottom member for clamping the shell securely in position between said members, a casing surrounding said air-tube for holding a mass of filtering material, and means for pressing the upper edge of said casing tightly against the top member of said receptacle.

2. An air filtering and distributing device comprising a receptacle composed of a top and bottom member and a shell interposed between said members, an air-tube depending from said top member and provided with a shank that projects through said bottom member, a nut on said shank arranged below said bottom member for clamping the shell securely in position between said members, a casing surrounding said air-tube for holding a mass of filtering material, a bottom cap-piece that forms a closure for the lower end of said casing, and an adjustable device on the shank of the air-tube which clamps said bottom cap-piece against the lower end of the casing and also forces the upper end of the casing tightly against the under side of the top member of said receptacle.

3. An air filtering and distributing device comprising a receptacle composed of a top and bottom member and a shell interposed between said members, an air-tube depending from said top member and provided with a shank that projects through said bottom member, a nut on said shank arranged below said bottom member for clamping the shell securely in position between said members, a casing surrounding said air-tube for holding a mass of filtering material, a bottom cap-piece that forms a closure for the lower end of said casing, an adjustable device on the shank of the air-tube which clamps said bottom cap-piece against the lower end of the casing and also forces the upper end of the casing tightly against the under side of the top member of said receptacle, means whereby the air that enters through said air-tube is caused to travel longitudinally of said casing through the filtering material in same, and air-distributing valves for controlling the passage of the filtered air from the device.

4. An air-filtering and distributing device comprising a receptacle provided with an air-tube through which air is admitted to the receptacle, a casing surrounding said air-tube for holding a quantity of filtering material, said air-tube being provided adjacent its lower end with ports and said casing being provided adjacent its upper end with ports whereby the air that is supplied through said air-tube will travel upwardly through the filtering material in the casing, and distributing valves carried by the top piece of the receptacle for controlling the passage of the filtered air from the receptacle.

5. An air-filtering and distributing device comprising a top member provided with an integral air-tube that depends therefrom, a shank at the lower end of said air-tube, an open-ended shell whose upper edge bears against the under side of said top member, a casing for filtering material surrounding said air-tube and having its upper edge bearing against the under side of said top member, closures for the lower end of said casing and said shell, and means on the shank of said air-tube for retaining said closures in position and for pressing said shell and casing tightly against the under side of the top member of the device.

In testimony whereof I hereunto affix my signature in the presence of two witnesses, this eleventh day of June, 1913.

PAUL E. NOLDEN.

Witnesses:
WELLS L. CHURCH,
GEORGE BAKEWELL.